(12) United States Patent
Du et al.

(10) Patent No.: US 12,126,409 B2
(45) Date of Patent: Oct. 22, 2024

(54) MULTIPLE-INPUT MULTIPLE-OUTPUT MODE CONFIGURATION METHOD AND APPARATUS, AND STORAGE MEDIUM

(71) Applicant: Beijing Xiaomi Mobile Software Co., Ltd., Beijing (CN)

(72) Inventors: Lei Du, Beijing (CN); Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 104 days.

(21) Appl. No.: 17/910,650

(22) PCT Filed: Mar. 12, 2020

(86) PCT No.: PCT/CN2020/079050
§ 371 (c)(1),
(2) Date: Sep. 9, 2022

(87) PCT Pub. No.: WO2021/179266
PCT Pub. Date: Sep. 16, 2021

(65) Prior Publication Data
US 2023/0137584 A1 May 4, 2023

(51) Int. Cl.
*H04B 7/0426* (2017.01)
*H04B 7/0456* (2017.01)
(52) U.S. Cl.
CPC ......... *H04B 7/0434* (2013.01); *H04B 7/0473* (2013.01)
(58) Field of Classification Search
CPC ... H04B 7/0434; H04B 7/0473; H04B 7/0413

USPC ......................................................... 375/262
See application file for complete search history.

(56) References Cited

U.S. PATENT DOCUMENTS

| 2011/0026420 A1 | 2/2011 | Zhang et al. |
| 2012/0113869 A1 | 5/2012 | Gaal et al. |
| 2014/0140424 A1 | 5/2014 | Clevorn |

FOREIGN PATENT DOCUMENTS

| CN | 101969369 A | 2/2011 |
| CN | 102055567 A | 5/2011 |
| CN | 104486042 A | 4/2015 |
| CN | 110012549 A | 7/2019 |
| CN | 110049563 A | 7/2019 |
| CN | 110099151 A | 8/2019 |

(Continued)

OTHER PUBLICATIONS

International Search Report of International Application No. PCT/CN2020/079050, mailed Nov. 27, 2020.

(Continued)

*Primary Examiner* — Leila Malek
(74) *Attorney, Agent, or Firm* — Finnegan, Henderson, Farabow, Garrett & Dunner, L.L.P.

(57) ABSTRACT

A multiple-input multiple-output (MIMO) mode configuration method is applied to a terminal, and includes: determining a triggering factor, the triggering factor including terminal information that triggers MIMO mode adjustment; sending a first instruction, the first instruction being used for requesting a network device to configure an MIMO mode matched with the triggering factor for the terminal; and obtaining a second instruction, the second instruction being used for representing the MIMO mode configured by the network device for the terminal.

17 Claims, 4 Drawing Sheets

(56) References Cited

FOREIGN PATENT DOCUMENTS

JP         2010-4243  A     1/2010
WO    WO 2020/034128 A1    2/2020

OTHER PUBLICATIONS

The First Office Action mailed Sep. 27, 2022, from The State Intellectual Property Office of People's Republic of China issued in counterpart Chinese Application No. 202080000529.7.
The Second Office Action for Chinese Application No. 202080000529.7, dated May 27, 2023, 22 pages.
ZTE, "Addition of MIMO Mode info over Iur," 3GPP TSG RAN WG3 Meeting #77, R3-121755, Qingdao, China, Aug. 13-17, 2021, 2 pages.

MULTIPLE-INPUT MULTIPLE-OUTPUT MODE CONFIGURATION METHOD AND APPARATUS, AND STORAGE MEDIUM

CROSS-REFERENCE TO RELATED APPLICATION

The present application is a U.S. National Stage of International Application No. PCT/CN2020/079050, filed on Mar. 12, 2020, the entire contents of which are incorporated herein by reference.

TECHNICAL FIELD

The present disclosure relates to the field of communication technologies, and in particularly, to a multiple-input multiple-output mode configuration method, an apparatus and a storage medium.

BACKGROUND

Multiple-input multiple-output (MIMO) technology can improve data throughput and signal-to-noise ratio, and can improve system performance and communication quality.

In the related art, the terminal needs to report the terminal support capability to the network device, and at the same time periodically measures the channel according to the requirements of the network device and reports the channel quality, such as a channel quality indicator (CQI). The network device configures the MIMO mode for the terminal according to the capabilities supported by the terminal and the channel measurement result.

SUMMARY

According to a first aspect of the embodiments of the present disclosure, there is provided a method for configuring a multiple-input multiple-output mode, applied to a terminal, including:

determining a triggering factor, where the triggering factor including terminal information configured to trigger adjustment of the multi-input multi-output (MIMO) mode: sending a first instruction, where the first instruction is configured to request a network device to configure the MIMO mode matched with the triggering factor for the terminal; and obtaining a second instruction, where the second instruction is configured to represent the MIMO mode configured for the terminal by the network device.

According to a second aspect of the embodiments of the present disclosure, there is provided a method for configuring a multiple-input multiple-output mode, applied to a network device, including:

receiving a first instruction being configured to request the network device to configure for a terminal a multiple-input multiple-output (MIMO) mode matched with a triggering factor, where the triggering factor includes terminal information configured to trigger adjustment of the MIMO mode; and configuring the MIMO mode matched with the triggering factor for the terminal, and sending a second instruction being used to indicate the MIMO mode configured for the terminal by the network device.

According to a third aspect of the embodiments of the present disclosure, there is provided an apparatus for configuring a multiple-input multiple-output mode, applied to a terminal, including:

a determination unit, configured to determine a triggering factor including terminal information configured to trigger adjustment of the multiple-input multiple-output (MIMO) mode; a sending unit, configured to send a first instruction being configured to request a network device to configure the MIMO mode matched with the triggering factor for the terminal; and an obtaining unit, configured to obtain a second instruction being used to represent the MIMO mode configured for the terminal by the network device.

According to a fourth aspect of the present disclosure, there is provided an apparatus for configuring a multiple-input multiple-output mode, applied to a network device, including:

a receiving unit, configured to receive a first instruction being configured to request the network device to configure for a terminal a multiple-input multiple-output (MIMO) mode matched with a triggering factor, where the triggering factor includes terminal information configured to trigger adjustment of the MIMO mode; a processing unit, configured to configure the MIMO mode matched with the triggering factor for the terminal; and a sending unit, configured to send a second instruction being used to indicate the MIMO mode configured for the terminal by the network device.

According to a fifth aspect of the embodiments of the present disclosure, there is provided a device for configuring a multiple-input multiple-output mode, including:

a processor; and a memory for storing an executable instruction by the processor;

where, the processor is configured to: execute the method for configuring the multiple-input multiple-output mode according to the first aspect of any embodiment of the first aspect.

According to a sixth aspect of the embodiments of the present disclosure, there is provided a device for configuring a multiple-input multiple-output mode, including:

a processor; and a memory for storing an executable instruction by the processor;

where, the processor is configured to: execute the method for configuring the multiple-input multiple-output mode according to the second aspect of any embodiment of the second aspect.

According to a seventh aspect of the embodiments of the present disclosure, there is provided a non-transitory computer-readable storage medium, when an instruction in the storage medium is executed by a processor of a mobile terminal, enabling the mobile terminal to execute the method for configuring the multiple-input multiple-output mode according to the first aspect of any embodiment of the first aspect.

According to an eighth aspect of the embodiments of the present disclosure, there is provided a non-transitory computer-readable storage medium, when an instruction in the storage medium is executed by a processor of a mobile terminal, enabling the mobile terminal to execute the method for configuring the multiple-input multiple-output mode according to the second aspect of any embodiment of the second aspect.

The technical solutions provided by the embodiments of the present disclosure may include the following beneficial effects: the terminal determines a triggering factor used for triggering the adjustment of the MIMO mode, and sends a first instruction to the network device to request the network device to configure the MIMO mode matched with the triggering factor for the terminal. The network device configures the MIMO mode matched with the triggering factor for the terminal, and sends a second instruction to the terminal to indicate the MIMO mode matched with the triggering factor. The terminal obtains the second instruction and determines the MIMO mode matched the triggering factor configured for the terminal by the network device, so that when the factors of the terminal itself change and trigger the adjustment of the MIMO mode, it can directly trigger the adjustment for the MIMO mode, enabling channel measurement and feedback and other behaviors to change accordingly, thereby reducing the adjustment time of the MIMO configuration.

It is to be understood that the foregoing general description and the following detailed description are exemplary and explanatory and are not restrictive of the present disclosure.

BRIEF DESCRIPTION OF THE DRAWINGS

The accompanying drawings, which are incorporated in and constitute a part of the description, illustrate embodiments consistent with the present disclosure and serve to explain the principles of the present disclosure together with the description.

DETAILED DESCRIPTION

Embodiments will be described in detail herein, examples of which are illustrated in the accompanying drawings. When the following description refers to the drawings, the same numerals in different drawings represent the same or similar elements unless otherwise indicated. The implementations described in the illustrative examples below are not intended to represent all implementations consistent with this disclosure. Rather, they are merely examples of apparatus and methods consistent with some aspects of the present disclosure as recited in the appended claims.

Figure 1:
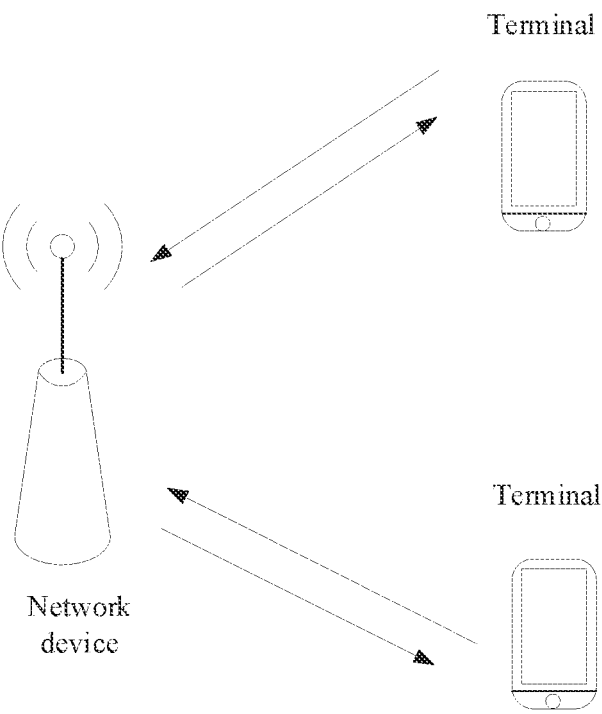
FIG. 1 is a schematic diagram of a wireless communication system according to an embodiment of the present disclosure.

The real-time changes of many factors of the terminal itself have an impact on the transmission and reception of terminal antenna signals, such as changes in the relative position of components, changes in shape caused by folding, etc., which may actually affect the distance and irrelevance between antennas, thereby affecting the MIMO effect. The MIMO mode configuration method provided by embodiments of the present disclosure can be applied to the wireless communication system shown in FIG. 1. Referring to FIG. 1, the wireless communication system includes a network device and terminals. The terminals are connected to the network device through wireless resources, and perform data transmission.

It can be understood that the wireless communication system shown in FIG. 1 is a schematic illustration, and the wireless communication system may also include other network devices, such as core network devices, wireless relay devices, and wireless backhaul devices, etc., not shown in FIG. 1. The embodiments of the present disclosure do not limit the number of network devices and the number of terminals included in the wireless communication system.

It can be further understood that the wireless communication system according to the embodiments of the present disclosure is a network providing a wireless communication function. A wireless communication system may employ different communication technologies, such as code division multiple access (CDMA), wideband code division multiple access (WCDMA), time division multiple access (TDMA), frequency division multiple access (FDMA), orthogonal frequency division multiple access (OFDMA), single carrier FDMA (SC-FDMA), carrier sense Carrier Sense Multiple Access with Collision Avoidance. According to the capacity, speed, delay and other factors of different networks, the network can be divided into 2G (generation) network, 3G network, 4G network or future evolution network, such as 5G network, 5G network can also be called New Radio (NR). For convenience of description, the present disclosure will sometimes refer to the wireless communication network simply as a network.

Further, the network device involved in the present disclosure may also be referred to as wireless access network device. The wireless access network device may be: a base station, an evolved node base station (evolved node B), a home base station, an access point (AP) in a wireless fidelity (WIFI) system, a wireless relay node, a wireless backhaul node, a transmission point (TP) or a transmission and reception point (TRP), etc.: it may also be a gNB in an NR system, or may be a component or part of a device that constitutes a base station. It is to be understood that, in some embodiments of the present disclosure, the specific technology and specific device form adopted by the network device are not limited. In the present disclosure, a network device may provide communication coverage for a specific geographic area, and may communicate with terminals located within the coverage area (cell). In addition, when it is a vehicle-to-everything (V2X) communication system, the network device may also be an vehicle-mounted device.

Further, the terminal involved in the present disclosure may also be referred to as terminal equipment, user equipment (UE), mobile station (MS), mobile terminal (MT), etc. It is a device that provides voice and/or data connectivity to the user. For example, a terminal may be a handheld device with wireless connectivity, a vehicle-mounted device, or the like. At present, some examples of terminals are: a mobile phone, a pocket personal computer (PPC), a handheld computer, a personal digital assistant (PDA), a notebook computer, a tablet computer, a wearable device, or vehicle-mounted equipment, etc. In addition, when it is a vehicle-to-everything (V2X) communication system, the terminal device can also be an vehicle-mounted device. It can be understood that the embodiments of the present disclosure do not limit the specific technology and specific device form adopted by the terminal.

In the related art, the MIMO technology is used to increase the data transmission rate, and to improve the data throughput and signal-to-noise ratio. MIMO refers to the use of multiple transmitting antennas and multiple receiving antennas at the transmitter and receiver, respectively, so that signals are transmitted and received through multiple antennas at the transmitter and receiver to improve data throughput and signal-to-noise ratio, thereby improving system performance and communication quality. It can make full use of space resources, realize multiple transmission and multiple reception through multiple antennas, and can double the system channel capacity without increasing spectrum resources and antenna transmission power.

Figure 2:
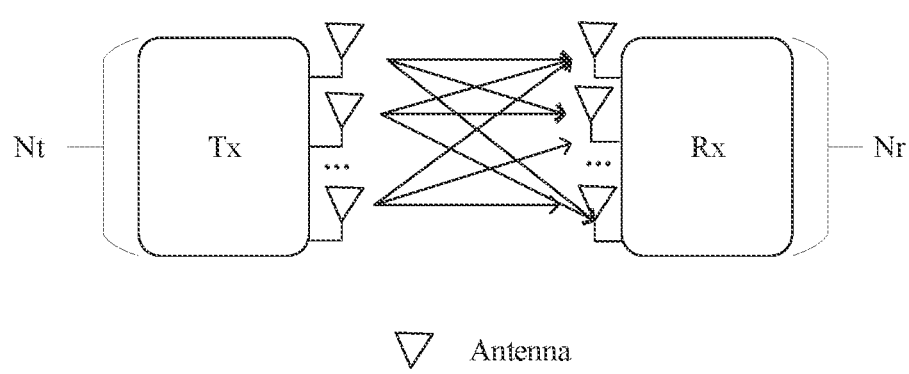
FIG. 2 is a schematic diagram of a communication process in a MIMO mode according to an embodiment of the present disclosure.

MIMO technology is increasingly being applied to a variety of high data rate technologies, including WiFi, 4G Long Term Evolution (LTE), and 5G NR. A MIMO system refers to the parallel transmission of multiple signal streams over the air. The data streams input at the transmitter are converted into several parallel symbol streams, which are transmitted from the Nt antennas at the same time. The signals are received by the receiver from the Nr receiving antennas and restored to original signals, as shown in FIG. 2.

In MIMO technology, multiple signal streams can be different data streams or different versions of a same data stream. Different data streams can be understood as different information being transmitted at the same time, which improves the efficiency of information transmission and improves the efficiency of wireless communication. Different versions of the same data stream (same information, different expressions) are transmitted in parallel to ensure the accuracy of the information received by the receiver and improve the reliability of information transmission. Among them, the working mode that improves the information transmission efficiency is called a multiplexing mode of MIMO. The working mode that improves the reliability of information transmission is called a diversity mode of MIMO.

An important feature of the MIMO system is that the data transmission rate can be increased through space division multiplexing technology. The space division multiplexing technology uses the difference of signal transmission in space to obtain different information from different multipath transmissions, or to enhance the same information transmitted. The reception and transmission under the multipath effect are closely related to the antenna layout of the terminal. For example, if the layouts of two antennas are too close and the correlation is too large, their reception and transmission characteristics are quite similar, which is not conducive to the application effect of MIMO.

In addition, in order to implement MIMO, the terminal needs to report its own support capability to the network device, and at the same time, periodically or according to the requirements of the network device, perform channel measurement and report the channel quality, such as CQI, etc. The configuration of the MIMO mode of the terminal is configured based on the measurement, and the MIMO mode is changed when the channel conditions change. However, the real-time changes of many factors of the terminal have an impact on the antenna, such as the relative position change of the components of the terminal, the change of the terminal modality caused by folding, etc., which will actually affect the distance and irrelevance between the antennas, thereby affecting the MIMO effect. How to quickly cope with the impact of the shape on MIMO when the shape of the terminal changes is a problem to be optimized in the embodiments of the present disclosure.

The present disclosure provides a MIMO mode configuration method, which directly triggers adjustment of the MIMO mode when the factors of the terminal itself change and trigger the adjustment of the MIMO mode, so that channel measurement and feedback and other behaviors are changed accordingly, thereby reducing the adjustment time of the MIMO configuration.

Figure 3:
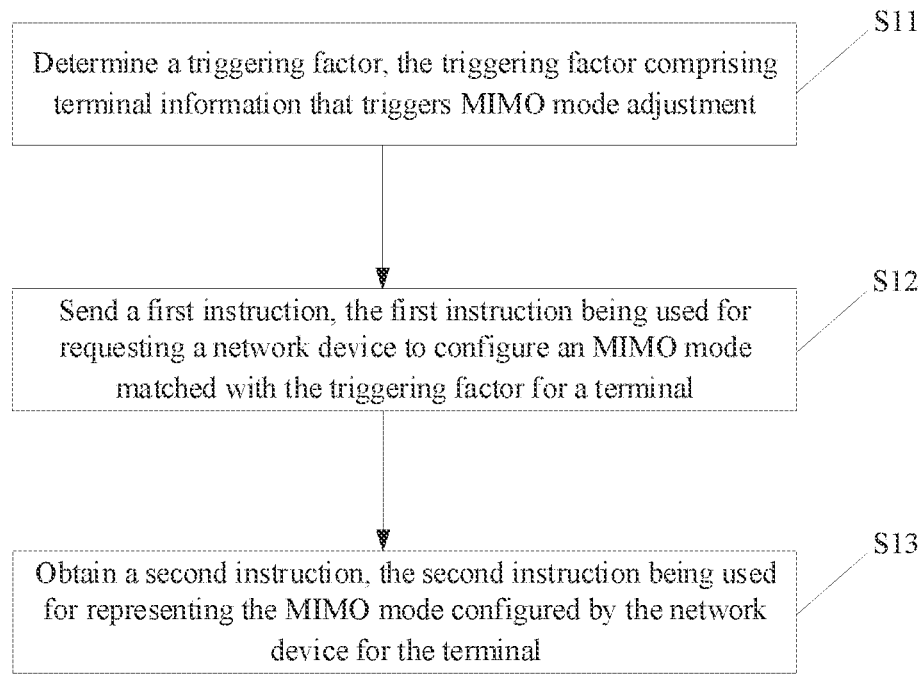
FIG. 3 is a flowchart of a method for configuring a MIMO mode according to an embodiment.

FIG. 3 is a flowchart of a method for configuring a MIMO mode according to an embodiment. As shown in FIG. 3, the method for configuring the MIMO mode is used in a terminal, and includes the following steps.

In step S11, a triggering factor is determined, and the triggering factor includes terminal information configured to trigger adjustment of the MIMO mode.

In some embodiments of the present disclosure, the triggering factor refers to terminal information that can trigger adjustment of the MIMO mode. For example, the triggering factor includes at least one of relative position information of a component of the terminal and terminal modality information. The relative position information of the terminal device can be understood as the relative position information of the component devices of the terminal, and this factor will affect the occlusion condition of the MIMO antenna device. For example, but not limited to the pop-up of the telescopic camera, the occlusion of the nearby MIMO antenna will be different when it is retracted and extended. The terminal modality information can be understood as the shape of the terminal. For example, if the terminal is in an unfolded state or a folded state, different folding angles will affect the distance, angle and relative position between the MIMO antennas, thereby affecting the antenna isolation.

On one hand, the triggering factor of the terminal may be determined based on preconfigured information. Or on the other hand, the triggering factor of the terminal may also be determined based on broadcast signaling, radio resource control (RRC) upper layer configuration signaling or physical layer control signaling.

In step S12, a first instruction is sent, where the first instruction is configured to request the network device to configure the MIMO mode matched with the triggering factor for the terminal.

In some embodiments of the present disclosure, after determining the triggering factor used for triggering the adjustment of the MIMO mode, the terminal sends a first instruction to the network device to request the network device to configure the MIMO mode matched with the triggering factor for the terminal.

The triggering factor for triggering adjustment of the MIMO mode may be carried in the uplink control signaling or the uplink RRC configuration signaling, and the terminal sends the first instruction based on the uplink control signaling or the uplink RRC configuration signaling.

In step S13, a second instruction is obtained, where the second instruction is configured to represent the MIMO mode configured for the terminal by the network device.

In some embodiments of the present disclosure, the network device receives the first instruction, configures the MIMO mode matched with the triggering factor for the terminal, and sends a second instruction for instructing to configure the MIMO mode, so as to indicate the MIMO mode matched the triggering factor to the terminal.

Figure 4:
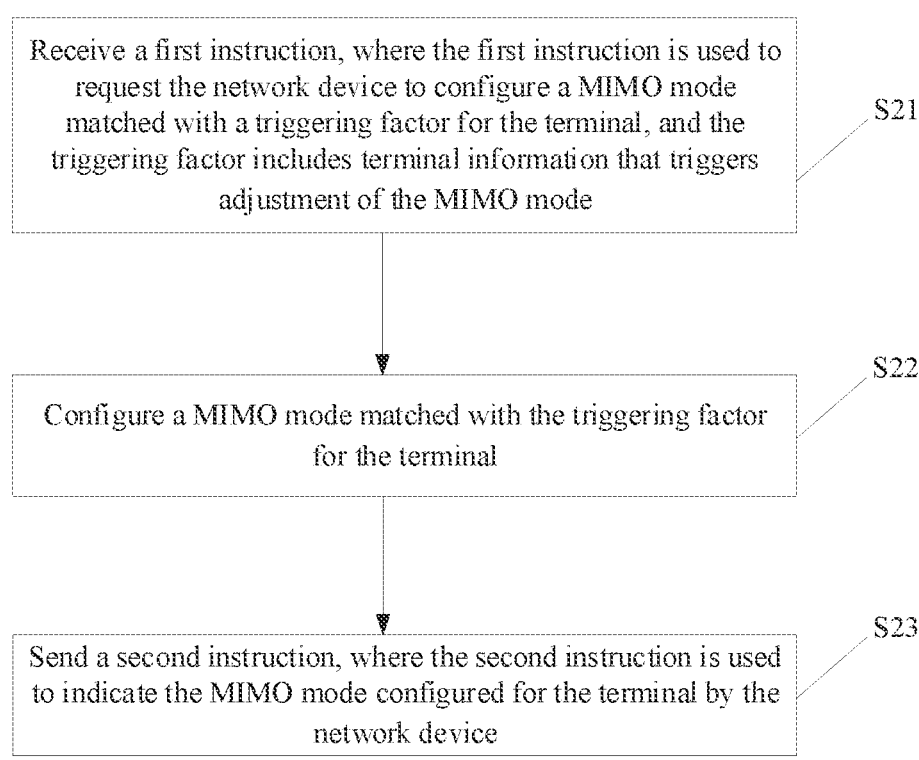
FIG. 4 is a flowchart of a method for configuring a MIMO mode according to an embodiment.

FIG. 4 is a flowchart showing a method for configuring a MIMO mode according to an embodiment. As shown in FIG. 4, the method for configuring the MIMO mode is used in a network device, and includes the following steps.

In step S21, a first instruction is received, where the first instruction is configured to request the network device to configure the MIMO mode matched with a triggering factor for the terminal, and the triggering factor includes terminal information configured to trigger adjustment of the MIMO mode.

In step S22, a MIMO mode matched with the triggering factor is configured for the terminal.

In step S23, a second instruction is sent, where the second instruction is configured to indicate the MIMO mode configured for the terminal by the network device.

In some embodiments of the present disclosure, the terminal determines a triggering factor used for triggering the adjustment of the MIMO mode, and sends a first instruction to the network device to request the network device to configure the MIMO mode matched with the triggering factor for the terminal. The network device configures the MIMO mode matched with the triggering factor for the terminal, and sends a second instruction to the terminal to indicate the MIMO mode matched with the triggering factor. The terminal obtains the second instruction and determines the MIMO mode matched with the triggering factor configured for the terminal by the network device. Compared with adjustment of the MIMO mode based on measurement, the time for adjustment of the MIMO mode can be reduced.

In some embodiments of the present disclosure, the configuration of the MIMO mode involved in the foregoing embodiments will be described below with reference to practical applications.

In some embodiments of the present disclosure, a trigger condition for the terminal to send the first instruction is set, and the first instruction is sent when the triggering factor determined by the terminal satisfies the trigger condition.

Further, the corresponding relationship between the triggering factor and the MIMO mode is set in some embodiments of the present disclosure. After the terminal determines the triggering factor, the network device determines the MIMO mode matched the triggering factor according to the corresponding relationship between the triggering factor and the MIMO mode.

In some embodiments of the present disclosure, the triggering factor has different states. For example, when the triggering factor is a terminal modality, different terminal modalities correspond to different states. For example, the terminal in the unfolded state corresponds to a first state, and the terminal in the folded state corresponds to a second state. When the triggering factor is the relative position information of a component of the terminal, different positions of the terminal device correspond to different states. For example, when the terminal telescopic camera is retracted, it corresponds to a third state, when the terminal telescopic camera is popped up, it corresponds to a fourth state.

In some embodiments of the present disclosure, different states of the triggering factors are quantized, so that different states have different state quantization values, and different state quantization values correspond to different MIMO modes.

When different states of the triggering factors are quantized in some embodiments of the present disclosure, different quantization states may be provided according to different triggering factors. In an example, the quantization is performed based on the absolute state of the triggering factor in some embodiments of the present disclosure, and the state after the quantization of the absolute state of the triggering factor is referred to as a first quantization state here. The first quantization state represents the absolute state of the triggering factor, which may also be referred to as the Bayer state. For example, the first quantization state may be the extended state and the retracted state of the telescopic camera of the terminal, and whether the terminal is in a folded state. In some embodiments, the first quantization state corresponds to a plurality of different first quantization state values, where the plurality of different first quantization state values represent a plurality of different absolute states of the triggering factor. For example, different bit values (0 and 1) of 1 bit are used to represent whether the telescopic camera of the terminal is popped up or not, or whether the terminal is in a folded state or not. Alternatively, different bit values (00, 01, 10, 11) of 2 bit are used to represent 4 different shapes and states of the terminal.

In another example, the quantization is performed based on the relative state of the triggering factor in some embodiments of the present disclosure, and the state after the quantization of the relative state of the triggering factor is referred to as a second quantization state here. The second quantization state represents the relative state of the triggering factor. For example, the second quantization state may be an amount that can be quantized, such as shape information of the terminal. In some embodiments of the present disclosure, the second quantization state corresponds to a plurality of different second quantization state values, and the plurality of different second quantization state values represent a plurality of different relative states of the triggering factor. For example, the folding angle of the folding screen mobile phone can be quantized into different second quantization state values.

In some embodiments of the present disclosure, the state quantization value of the current state of the triggering factor includes a first quantization state value, a second quantization state value, or a first comprehensive quantization state value determined based on the first quantization state value and the second quantization state value.

In an example, the first comprehensive quantization state value determined based on the first quantization state value and the second quantization state value may be a value obtained by performing operations on the first quantization state value and the second quantization state value. For example, the first comprehensive quantization state value=the first quantization state value*the second quantization state value; or the first comprehensive quantization state value=the first quantization state value*a+the second quantization state value*b, where a and b are specified coefficients.

The state quantization value of the current state of the triggering factor in some embodiments of the present disclosure further includes a second comprehensive quantization state value. The second comprehensive quantization state value is determined based on the first comprehensive quantization state value and the channel measurement information. The second comprehensive quantization state value may also be understood as a comprehensive value obtained by performing operations on the first quantization state value, the second quantization state value, the first comprehensive quantization state value and the channel measurement information. For example, in some embodiments of the present disclosure, the second comprehensive quantization state value=f (the first comprehensive quantization state value, the channel measurement information). The f function may be a linear weight. For example, the second comprehensive quantization state value=c*the first comprehensive quantization state value+d*the channel measurement information, where c and d are specified coefficients. Alternatively, the f function may be weighted offset to the channel measurement information. For example, the second comprehensive quantization state value=the first comprehensive quantization state value*the channel measurement information. In summary, the second comprehensive quantization state value may represent an additional effect of the terminal information on the channel measurement information.

In some embodiments of the present disclosure, the state quantization values of different states of the triggering factor correspond to different MIMO modes. For example, the state quantization value corresponding to the pop-up state of the telescopic camera of the terminal is "0", and the corresponding MIMO mode is 2*2. The state quantization value corresponding to the non-pop-up state of the telescopic camera of the terminal is "1", and the corresponding MIMO mode is 4*4. For another example, the state quantization value corresponding to the fully unfolded state of the folding screen of the terminal with the folding screen is "00", and the corresponding MIMO mode is 4*4. The state quantization value corresponding to the fully folded state of the folding screen of the terminal with the folding screen is "11", and the corresponding MIMO mode is a higher-order MIMO mode, such as an 8*4 MIMO mode, or at least higher than the previous MIMO mode. It can be understood that the MIMO mode corresponding to the state quantization value of the state of the triggering factor is set according to the actual situation. For example, the pop-up camera module of the terminal telescopic camera has a millimeter-wave antenna module, which can support 4*4 MIMO mode after pop-up, but cannot support MIMO when it is not pop-up.

In some embodiments of the present disclosure, the network device or the terminal may determine the MIMO mode to be configured based on the state quantization value of the current state of the triggering factor of the terminal.

In some embodiments of the present disclosure, the trigger condition for the terminal to send the first instruction to the network device may be a state quantization threshold for adjustment of the MIMO mode. When the state quantization value of the current state of the triggering factor meets the state quantization threshold for triggering adjustment of the MIMO mode, the first instruction is sent.

Further, in some embodiments of the present disclosure, when the terminal requests the network device to configure the MIMO mode matched with the state quantization value of the current state, it may directly request the network device for the MIMO mode matched with the state quantization value of the current state of the triggering factor; or it may send the state quantization value of the current state of the triggering factor to the network device, and the network device determines a MIMO mode matched with the state quantization value of the current state of the triggering factor.

In some embodiments, the first instruction sent by the terminal to the network device includes a MIMO mode matched with the state quantization value of the current state of the triggering factor. After receiving the first instruction, the network device determines the MIMO mode matched with the state quantization value of the current state of the triggering factor as the MIMO mode matched with the triggering factor configured for the terminal. For example, when the telescopic camera pops up, it falls back to the 2*2 MIMO mode, and the first instruction includes the 2*2 MIMO mode. Or, when the folding angle of the folding screen exceeds 90 degrees, the 4*4 MIMO mode falls back to the 2*2 MIMO mode, and the first instruction includes the 2*2 MIMO mode. Or, when the telescopic camera is retracted and the folding angle of the folding screen exceeds 90 degrees, the 4*4 MIMO mode falls back to the 2*2 MIMO mode, and the first instruction includes the 2*2 MIMO mode.

In some embodiments, the first instruction sent by the terminal to the network device includes a state quantization value of the current state of the triggering factor. Based on the state quantization value of the current state of the triggering factor, the network device determines a MIMO mode matched with the state quantization value of the current state of the triggering factor, and determines the MIMO mode matched with the state quantization value of the current state of the triggering factor as the MIMO mode matched with the triggering factor configured for the terminal. For example, the first instruction includes one or more of a first quantization state value, a second quantization state value, a first comprehensive quantization value, and a second comprehensive quantization value. The network device determines whether to change the MIMO mode based on the state quantization value of the current state included in the first instruction, and determines to send the configured MIMO mode to the terminal.

In some embodiments of the present disclosure, there is a corresponding relationship between the state quantization value of the current state of the triggering factor and the order for the adjustment of the MIMO mode, and the terminal may send the order offset for the adjustment of the MIMO mode to the network device, and the network device will determine the MIMO mode matched with the state quantization value of the current state of the triggering factor. That is, the first instruction includes the order offset for the adjustment of the MIMO mode. When the network device configures the MIMO mode matched with the triggering factor for the terminal, it determines the MIMO mode configured for the terminal matched with the triggering factor, based on the order offset for the adjustment of the MIMO mode and the current order of the MIMO mode. For example, if the state quantization values of the triggering factor for the terminal includes "00, 01, 10, 11", the first instruction may include information for indicating that the state quantization value of the terminal triggering factor changes from "001" to "01".

By applying the MIMO mode configuration method provided by the embodiments of the present disclosure, a default MIMO mode can be set on the terminal, and then when the factors of the terminal itself change, the corresponding triggering factor is determined according to the current state of the terminal, and the MIMO mode is adjusted, for example, the MIMO mode is adjusted step by step, etc.

In the MIMO mode configuration method provided by the embodiments of the present disclosure, when the factors of the terminal itself change and adjustment of the MIMO mode is triggered, adjustment of the MIMO mode is directly triggered, so that the channel measurement and feedback behaviors are changed accordingly, thereby reducing the adjustment time of the MIMO configuration.

Based on the same concept, in some embodiments of the present disclosure, there is also provided an apparatus for configuring a MIMO mode.

It can be understood that, in order to implement the above functions, the apparatus for configuring the MIMO mode provided by the embodiments of the present disclosure includes corresponding hardware structures and/or software modules for executing each function. In combination with the units and algorithm steps of each example disclosed in the embodiments of the present disclosure, the embodiments of the present disclosure can be implemented in the form of hardware or a combination of hardware and computer software. Whether a function is performed by hardware or hardware driven by computer software depends on the specific application and design constraints of the technical solution. Those skilled in the art may use different methods to realize the described functions for each specific application, but such implementation should not be considered beyond the scope of the technical solution of the embodiments of the present disclosure.

Figure 5:
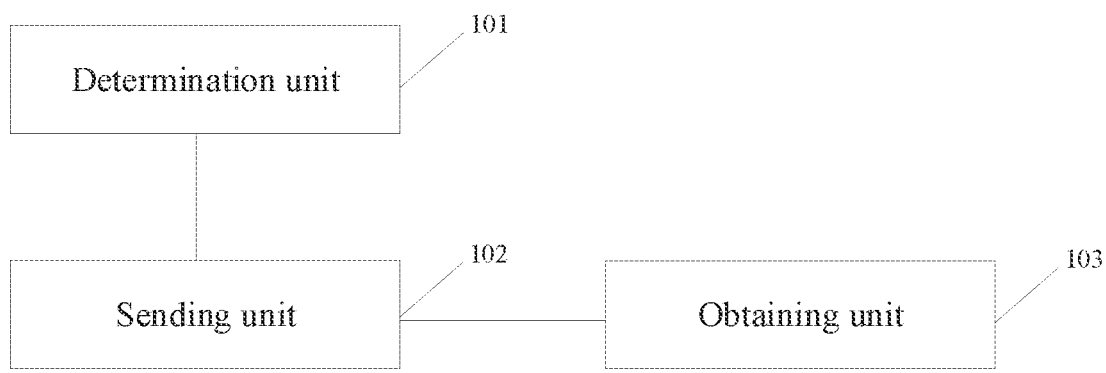
FIG. 5 is a block diagram of an apparatus for configuring a MIMO mode according to an embodiment.

FIG. 5 is a block diagram of an apparatus for configuring a multiple-input multiple-output mode according to an embodiment. Referring to FIG. 5, the apparatus 100 for configuring the MIMO mode is applied to a terminal, and includes a determination unit 101, a sending unit 102 and an obtaining unit 103.

The determination unit 101 is configured to determine a triggering factor, where the triggering factor includes terminal information configured to trigger adjustment of the MIMO mode. The sending unit 102 is configured to send a first instruction, where the first instruction is configured to request the network device to configure the MIMO mode matched with the triggering factor for the terminal. The obtaining unit 103 is configured to obtain a second instruction, where the second instruction is configured to represent the MIMO mode configured for the terminal by the network device.

In some embodiments, different states of the triggering factor have different state quantization values, and different state quantization values correspond to different MIMO modes.

The sending unit 102 is configured to send the first instruction in the following manner: when the state quantization value of the current state of the triggering factor meets the state quantization threshold for triggering the adjustment of the MIMO mode, the first instruction is sent.

In some embodiments, the first instruction includes a MIMO mode matched with the state quantization value of the current state of the triggering factor.

In some embodiments, the first instruction includes an order offset for the adjustment of the MIMO mode.

In some embodiments, the first instruction includes the state quantization value of the current state of the triggering factor.

In some embodiments, the states of the triggering factor include a first quantization state and a second quantization state. The first quantization state corresponds to a plurality of different first quantization state values, where the plurality of different first quantization state values represent a plurality of different absolute states of the triggering factor. The second quantization state corresponds to a plurality of different second quantization state values, and the plurality of different second quantization state values represent a plurality of different relative states of the triggering factor.

In some embodiments, the state quantization value of the current state of the triggering factor includes a first quantization state value, or a second quantization state value, or a first comprehensive quantization state value determined based on the first quantization state value and the second quantization state value.

In some embodiments, the state quantization value of the current state of the triggering factor further includes a second comprehensive quantization state value, and the second comprehensive quantization state value is determined based on the first comprehensive quantization state value and the channel measurement information.

In some embodiments, the triggering factor includes at least one of the relative position information of a component of the terminal and the terminal modality information.

In some embodiments, the determination unit 101 is configured to determine the triggering factor in the following manner.

The triggering factor is determined based on the preconfigured information. Or, the triggering factor is determined based on broadcast signaling, radio resource control upper layer configuration signaling or physical layer control signaling.

Figure 6:
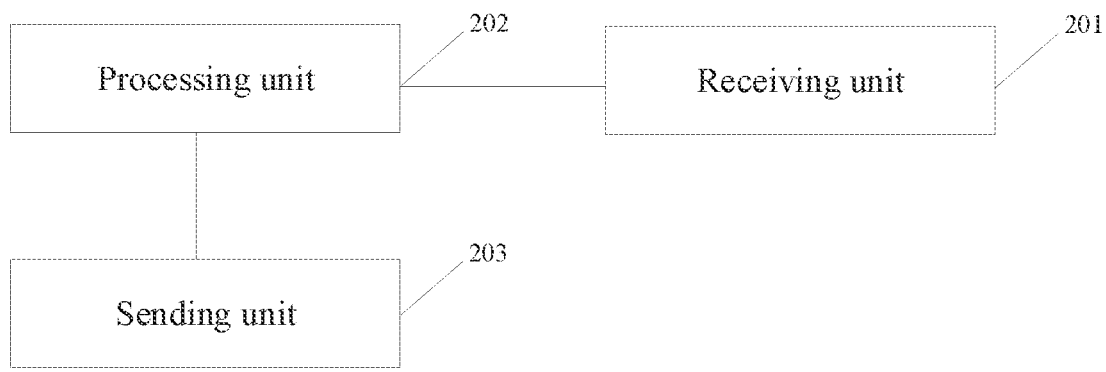
FIG. 6 is a block diagram of an apparatus for configuring a MIMO mode according to an embodiment.

FIG. 6 is a block diagram of an apparatus for configuring a multiple-input multiple-output mode according to an embodiment. Referring to FIG. 6, the apparatus 200 for configuring the MIMO mode is applied to a network device, and includes a receiving unit 201, a processing unit 202 and a sending unit 203.

The receiving unit 201 is configured to receive a first instruction, where the first instruction is configured to request the network device to configure a multiple-input multiple-output MIMO mode matched with the triggering factor for the terminal, where the triggering factor includes terminal information configured to trigger adjustment of the MIMO mode. The processing unit 202 is configured to configure the MIMO mode matched with the triggering factor for the terminal. The sending unit 203 is configured to send a second instruction, where the second instruction is configured to indicate the MIMO mode configured for the terminal by the network device.

In some embodiments, different states of the triggering factor have different state quantization values, and different state quantization values correspond to different MIMO modes.

In some embodiments, the first instruction includes a MIMO mode matched with the state quantization value of the current state of the triggering factor. The processing unit is configured to configure the MIMO mode matched with the triggering factor for the terminal in the following manner: determining the MIMO mode matched with the state quantization value of the current state of the triggering factor as the MIMO mode matched with the triggering factor configured for the terminal.

In some embodiments, the first instruction includes an order offset for the adjustment of the MIMO mode.

The processing unit 202 is configured to configure the MIMO mode matched with the triggering factor for the terminal in the following manner.

The MIMO mode matched with the triggering factor configured for the terminal is determined based on the order offset for the adjustment of the MIMO mode and the current order of the MIMO mode.

In some embodiments, the first instruction includes the state quantization value of the current state of the triggering factor.

The processing unit 202 is configured to configure the MIMO mode matched with the triggering factor for the terminal in the following manner.

Based on the state quantization value of the current state of the triggering factor, a MIMO mode matched with the state quantization value of the current state of the triggering factor is determined. The MIMO mode matched with the state quantization value of the current state of the triggering factor is determined as the MIMO mode matched with the triggering factor configured for the terminal.

In some embodiments, the states of the triggering factor include a first quantization state and a second quantization state. The first quantization state corresponds to a plurality of different first quantization state values, where the plurality of different first quantization state values represent a plurality of different absolute states of the triggering factor. The second quantization state corresponds to a plurality of different second quantization state values, and the plurality of different second quantization state values represent a plurality of different relative states of the triggering factor.

In some embodiments, the state quantization value of the current state of the triggering factor includes a first quantization state value, or a second quantization state value, or a first comprehensive quantization state value determined based on the first quantization state value and the second quantization state value.

In some embodiments, the state quantization value of the current state of the triggering factor further includes a second comprehensive quantization state value, and the second comprehensive quantization state value is determined based on the first comprehensive quantization state value and the channel measurement information.

In some embodiments, the triggering factor includes at least one of the relative position information of a component of the terminal and the terminal modality information.

In some embodiments, the sending unit 203 of the present disclosure is further configured to:

configure the triggering factor based on broadcast signaling, radio resource control upper layer configuration signaling or physical layer control signaling.

In some embodiments, the receiving unit 201 is configured to receive the first instruction in the following manner: receiving the first instruction based on uplink control signaling or uplink radio resource control configuration signaling.

Regarding the apparatus in the above-mentioned embodiments, the specific manner in which each module performs operations has been described in detail in the embodiments of the method, and will not be described in detail here.

Figure 7:
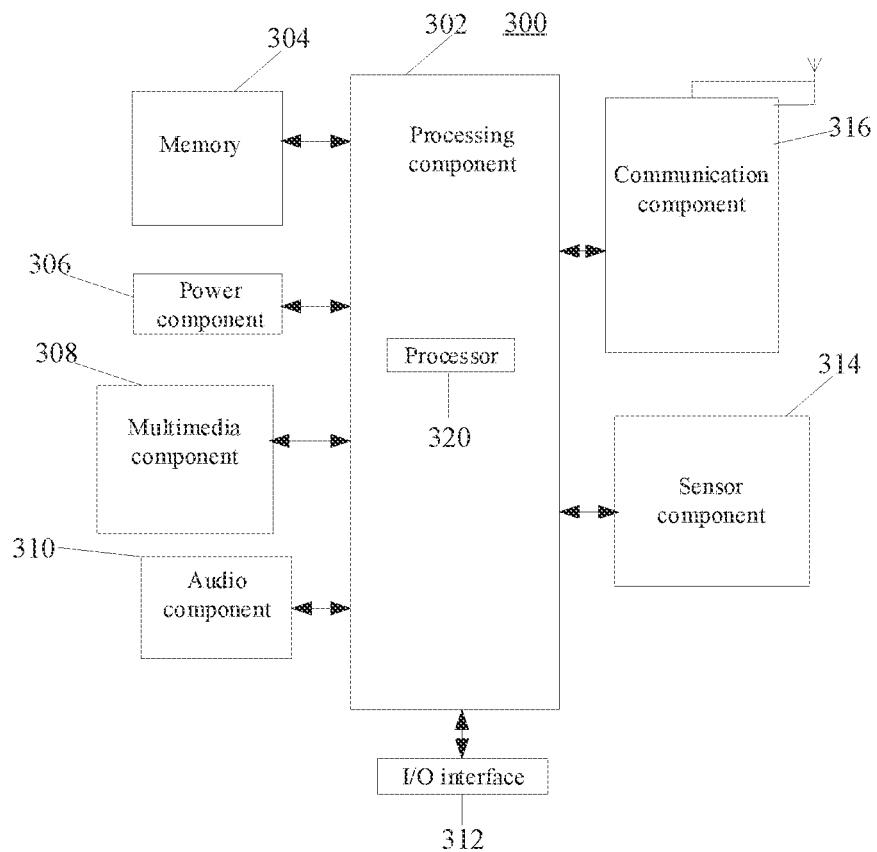
FIG. 7 is a block diagram of a device according to an embodiment.

FIG. 7 is a block diagram of a device 300 for configuring the MIMO mode according to an embodiment. For example, device 30) may be a mobile phone, computer, digital broadcast terminal, messaging device, game console, tablet device, medical device, fitness device, personal digital assistant, and the like.

Referring to FIG. 7, the device 300 may include one or more of the following components: a processing component 302, a memory 304, a power component 306, a multimedia component 308, an audio component 310, an input/output (I/O) interface 312, a sensor component 314, and a communication component 316.

Processing component 302 generally controls the overall operation of the device 300, such as operations associated with display, phone calls, data communications, camera operations, and recording operations. The processing component 302 may include one or more processors 320 to execute instructions to perform all or part of the steps of the methods described above. Additionally, processing component 302 may include one or more modules that facilitate interaction between processing component 302 and other components. For example, processing component 302 may include a multimedia module to facilitate interaction between multimedia component 308 and processing component 302.

Memory 304 is configured to store various types of data to support operations at device 300. Examples of such data include instructions for any application or method operating on device 300, contact data, phonebook data, messages, pictures, videos, and the like. Memory 304 may be implemented by any type of volatile or non-volatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic or optical disk.

Power component 306 provides power to various components of device 300. Power components 306 may include a power management system, one or more power sources, and other components associated with generating, managing, and distributing power to device 300.

Multimedia component 308 includes a screen that provides an output interface between the device 300 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may sense the boundaries of a touch or swipe action, and detect the duration and pressure associated with the touch or swipe action. In some embodiments, the multimedia component 308 includes a front-facing camera and/or a rear-facing camera. When the device 300 is in an operation mode, such as a shooting mode or a video mode, the front camera and/or the rear camera may receive external multimedia data. Each of the front-facing camera and the rear-facing camera can be a fixed optical lens system or have focal length and optical zoom capability.

Audio component 310 is configured to output and/or input audio signals. For example, audio component 310 includes a microphone (MIC) that is configured to receive external audio signals when device 300 is in operating modes, such as call mode, recording mode, and voice recognition mode. The received audio signals may be further stored in memory 304 or transmitted via communication component 316. In some embodiments, audio component 310 also includes a speaker for outputting the audio signals.

The I/O interface 312 provides an interface between the processing component 302 and a peripheral interface module, which may be a keyboard, a click wheel, a button, or the like. These buttons may include, but are not limited to: home button, volume button, start button, and lock button.

Sensor component 314 includes one or more sensors for providing status assessment of various aspects of device 300. For example, the sensor component 314 can detect the open/closed state of the device 300, the relative positioning of components, such as the display and keypad of the device 300. The sensor component 314 can also detect a change in the position of the device 300 or a component of the device 300, the presence or absence of user contact with the device 300, the orientation or acceleration/deceleration of the device 300 and the temperature change of the device 300. Sensor component 314 may include a proximity sensor configured to detect the presence of nearby objects in the absence of any physical contact. Sensor component 314 may also include an optical sensor, such as a CMOS or CCD image sensor, for use in imaging applications. In some embodiments, the sensor component 314 may also include an acceleration sensor, a gyroscope sensor, a magnetic sensor, a pressure sensor, or a temperature sensor.

Communication component 316 is configured to facilitate wired or wireless communication between device 300 and other devices. Device 300 may access wireless networks based on communication standards, such as WiFi, 2G or 3G, or a combination thereof. In some embodiments, the communication component 316 receives broadcast signals or broadcast related information from an external broadcast management system via a broadcast channel. In some embodiments, the communication component 316 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In some embodiments, device 300 may be implemented by one or more application specific integrated circuits (ASIC), digital signal processors (DSP), digital signal processing devices (DSPD), programmable logic devices (PLD), field programmable gate array (FPGA), controller, microcontroller, microprocessor or other electronic component, used to perform the above method.

In some embodiments, there is provided a non-transitory computer-readable storage medium including instructions, such as memory 304 including instructions. The instructions are executable by the processor 320 of the device 300 to perform the above-described method. For example, the non-transitory computer-readable storage medium may be ROM, random access memory (RAM), CD-ROM, magnetic tape, floppy disk, optical data storage device, and the like.

Figure 8:
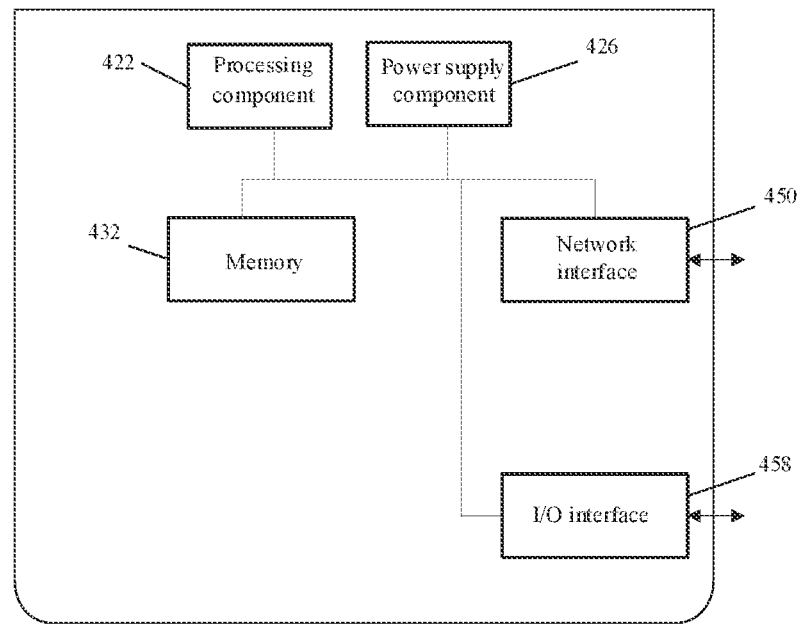
FIG. 8 is a block diagram of a device according to an embodiment.

FIG. 8 is a block diagram of a device 400 for configuring the MIMO mode according to an embodiment. For example, the device 400 may be provided as a server. Referring to FIG. 8, device 400 includes processing component 422, which further includes one or more processors, and a memory resource represented by memory 432, for storing instructions executable by processing component 422, such as an application program. The application program stored in memory 432 may include one or more modules, each corresponding to a set of instructions. Additionally, the processing component 422 is configured to execute instructions to perform the methods described above.

Device 400 may also include a power supply component 426 configured to perform power management of device 400, a wired or wireless network interface 450 configured to connect device 400 to a network, and an input output (I/O) interface 458. Device 400 may operate based on an operating system stored in memory 432, such as Windows Server™, Mac OS X®, Unix™, Linux™, FreeBSD™ or the like.

In some embodiments, there is also provided a non-transitory computer-readable storage medium including instructions, such as memory 432 including instructions. The instructions are executable by the processing component 422 of the device 400 to perform the method described above. For example, the non-transitory computer-readable storage medium may be ROM, random access memory (RAM), CD-ROM, magnetic tape, floppy disk, optical data storage device, and the like.

It is further understood that in the present disclosure, "plurality" refers to two or more, and other quantifiers are similar. "And/or", which describes the association relationship of the associated objects, means that there can be three kinds of relationships. For example, A and/or B, can mean that: A exists alone, A and B exist at the same time, and B exists alone. The character "/" generally indicates that the associated objects are an "or" relationship. The singular forms "a," "the," and "the" are intended to include the plural forms as well, unless the context clearly dictates otherwise.

It is further understood that the terms "first", "second", etc. are used to describe various information, but the information should not be limited to these terms. These terms are used to distinguish the information of same type from one another, and do not imply a particular order or level of importance. In fact, the expressions "first", "second" etc. are used completely interchangeably. For example, first information may also be referred to as second information, and similarly, second information may also be referred to as first information, without departing from the scope of the present disclosure.

It is further to be understood that, although the operations in the embodiments of the present disclosure are described in a specific order in the drawings, it should not be construed as requiring that the operations be performed in the specific order shown or the serial order, or requiring performing all operations shown to obtain the desired result. In certain circumstances, multitasking and parallel processing may be advantageous.

After considering the description and practicing the invention disclosed herein, those skilled in the art will easily think of other embodiments of the disclosure. The present application is intended to cover any variation, use or adaptive change of the present disclosure, which follows the general principles of the present disclosure and includes the common knowledge or customary technical means in the technical field not disclosed in the present disclosure. The description and the embodiments are considered as exemplary, and the true scope and spirit of the present disclosure are indicated by the following claims.

It is to be understood that the present disclosure is not limited to the precise structures described above and illustrated in the accompanying drawings. Various modifications and changes may be made without departing from the scope of the present disclosure, which is limited by the appended claims.

What is claimed is:

1. A method for configuring a multi-input multi-output (MIMO) mode, applied to a terminal, comprising:
   determining a triggering factor, wherein the triggering factor comprises terminal information configured to trigger adjustment of the MIMO mode;
   sending a first instruction, wherein the first instruction is configured to request a network device to configure the MIMO mode matched with the triggering factor for the terminal; and
   obtaining a second instruction, wherein the second instruction is configured to represent the MIMO mode configured for the terminal by the network device;
   wherein different states of the triggering factor have different state quantization values, and the different state quantization values correspond to different MIMO modes; and
   the sending the first instruction comprises:
   sending the first instruction, in response to determining that a state quantization value of a current state of the triggering factor meets a state quantization threshold for triggering the adjustment of the MIMO mode.

2. The method according to claim 1, wherein the first instruction comprises at least one of:
   a MIMO mode matched with the state quantization value of the current state of the triggering factor;
   an order offset for the adjustment of the MIMO mode; or
   the state quantization value of the current state of the triggering factor.

3. The method according to claim 1, wherein the states of the triggering factor comprise a first quantization state and a second quantization state;
   each value of the first quantization state is configured to represent an absolute state of a plurality of absolute states of the triggering factor; and
   each value of the second quantization state is configured to represent a relative state of a plurality of relative states of the triggering factor.

4. The method according to claim 3, wherein the state quantization value of the current state of the triggering factor comprises a first quantization state value, or a second quantization state value, or a first comprehensive quantization state value determined based on the first quantization state value and the second quantization state value.

5. The method according to claim 4, wherein the state quantization value of the current state of the triggering factor further comprises a second comprehensive quantization state value determined based on the first comprehensive quantization state value and channel measurement information.

6. The method according to claim 1, wherein the triggering factor comprises at least one of: relative position information of a component of the terminal and terminal modality information.

7. The method according to claim 1, wherein the determining the triggering factor comprises determining the triggering factor based on at least one of:
preconfigured information;
a broadcast signaling;
a radio resource control upper layer configuration signaling; or
a physical layer control signaling.

8. A method for configuring a multiple-input multiple-output (MIMO) mode, applied to a network device, comprising:
receiving a first instruction, wherein the first instruction is configured to request the network device to configure the MIMO mode matched with a triggering factor for a terminal, and the triggering factor comprises terminal information configured to trigger adjustment of the MIMO mode; and
configuring the MIMO mode matched with the triggering factor for the terminal, and sending a second instruction, wherein the second instruction is configured to indicate the MIMO mode configured for the terminal by the network device;
wherein different states of the triggering factor have different state quantization values, and the different state quantization values correspond to different MIMO modes;
the first instruction comprises a MIMO mode matched with a state quantization value of a current state of the triggering factor; and
the configuring the MIMO mode matched with the triggering factor for the terminal comprises:
determining the MIMO mode matched with the state quantization value of the current state of the triggering factor as the MIMO mode matched with the triggering factor configured for the terminal.

9. The method according to claim 8, wherein the first instruction comprises an order offset for the adjustment of the MIMO mode; and
the configuring the MIMO mode matched with the triggering factor for the terminal comprises:
determining the MIMO mode matched with the triggering factor configured for the terminal based on the order offset for the adjustment of the MIMO mode and a current order of the MIMO mode.

10. The method according to claim 8, wherein the first instruction comprises a state quantization value of a current state of the triggering factor; and
the configuring the MIMO mode matched with the triggering factor for the terminal comprises:
determining a MIMO mode matched with the state quantization value of the current state of the triggering factor, based on the state quantization value of the current state of the triggering factor; and
determining the MIMO mode matched with the state quantization value of the current state of the triggering factor as the MIMO mode matched with the triggering factor configured for the terminal.

11. The method of claim 8, wherein the states of the triggering factor comprise a first quantization state and a second quantization state;
each value of the first quantization state is configured to represent an absolute state of a plurality of absolute states of the triggering factor; and
each value of the second quantization state is configured to represent a relative state of a plurality of relative states of the triggering factor.

12. The method according to claim 11, wherein a state quantization value of a current state of the triggering factor comprises a first quantization state value, or a second quantization state value, or a first comprehensive quantization state value determined based on the first quantization state value and the second quantization state value.

13. The method according to claim 12, wherein the state quantization value of the current state of the triggering factor further comprises a second comprehensive quantization state value determined based on the first comprehensive quantization state value and channel measurement information.

14. The method according to claim 8, wherein the triggering factor comprises at least one of relative position information of a component of the terminal and terminal modality information.

15. The method according to claim 8, wherein the method further comprises:
configuring the triggering factor based on at least one of a broadcast signaling, a radio resource control upper layer configuration signaling, or a physical layer control signaling.

16. A network device, comprising:
a processor; and
a memory for storing an executable instruction by the processor;
wherein the processor is configured to perform the method according to claim 8.

17. A terminal, comprising:
a processor; and
a memory for storing an executable instruction by the processor;
wherein the processor is configured to:
determine a triggering factor, wherein the triggering factor comprises terminal information configured to trigger adjustment of a multiple-input multiple-output (MIMO) mode;
send a first instruction, wherein the first instruction is configured to request a network device to configure the MIMO mode matched with the triggering factor for the terminal; and
obtain a second instruction, wherein the second instruction is configured to represent the MIMO mode configured for the terminal by the network device;
wherein different states of the triggering factor have different state quantization values, and the different state quantization values correspond to different MIMO modes; and
the processor is further configured to:
send the first instruction, in response to determining that a state quantization value of a current state of the triggering factor meets a state quantization threshold for triggering the adjustment of the MIMO mode.

* * * * *